(No Model.) 3 Sheets—Sheet 1.

J. HOWDEN.
VALVE GEAR.

No. 456,414. Patented July 21, 1891.

WITNESSES:
George Baumann
John Revell

INVENTOR
James Howden
BY Howran and Howran
his ATTORNEYS (No Model.) 3 Sheets—Sheet 2.

J. HOWDEN.
VALVE GEAR.

No. 456,414. Patented July 21, 1891.

WITNESSES:
George Baumann
John Revell

INVENTOR
James Howden
BY Howson & Howson
his ATTORNEYS (No Model.) 3 Sheets—Sheet 3.
J. HOWDEN.
VALVE GEAR.
No. 456,414. Patented July 21, 1891.
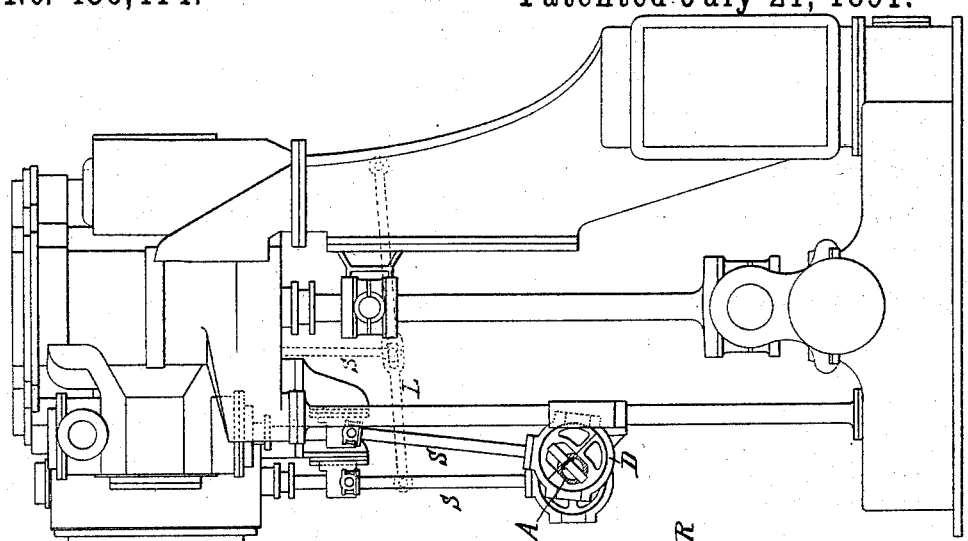
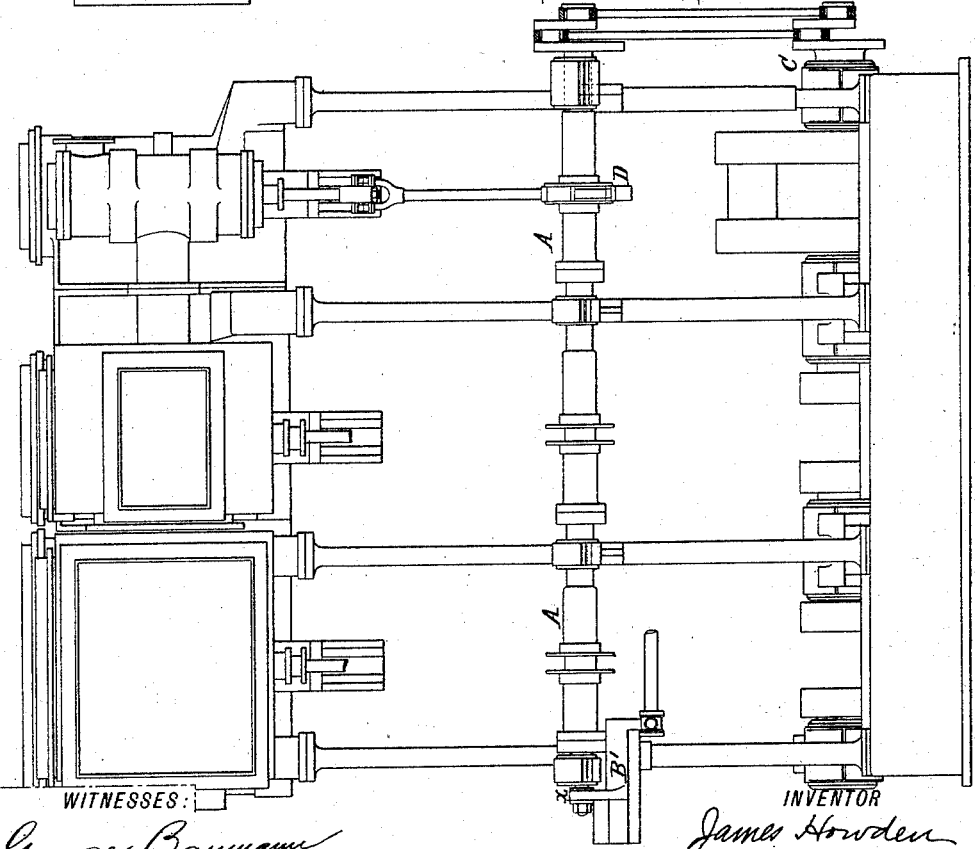

United States Patent Office.

JAMES HOWDEN, OF GLASGOW, SCOTLAND.

VALVE-GEAR.

SPECIFICATION forming part of Letters Patent No. 456,414, dated July 21, 1891.

Application filed November 3, 1890. Serial No. 370,148. (No model.)

*To all whom it may concern:*

Be it known that I, JAMES HOWDEN, a subject of the Queen of Great Britain and Ireland, and a resident of Glasgow, Scotland, have invented Improvements in Valve-Gear, of which the following is a specification.

The object of my invention is to improve and simplify the construction of eccentrics, and more especially eccentric valve-gear for marine and other engines, and my improvements have particular relation to means to take the place of the ordinary link motion for varying the cut-off and for reversing.

Figure 1:
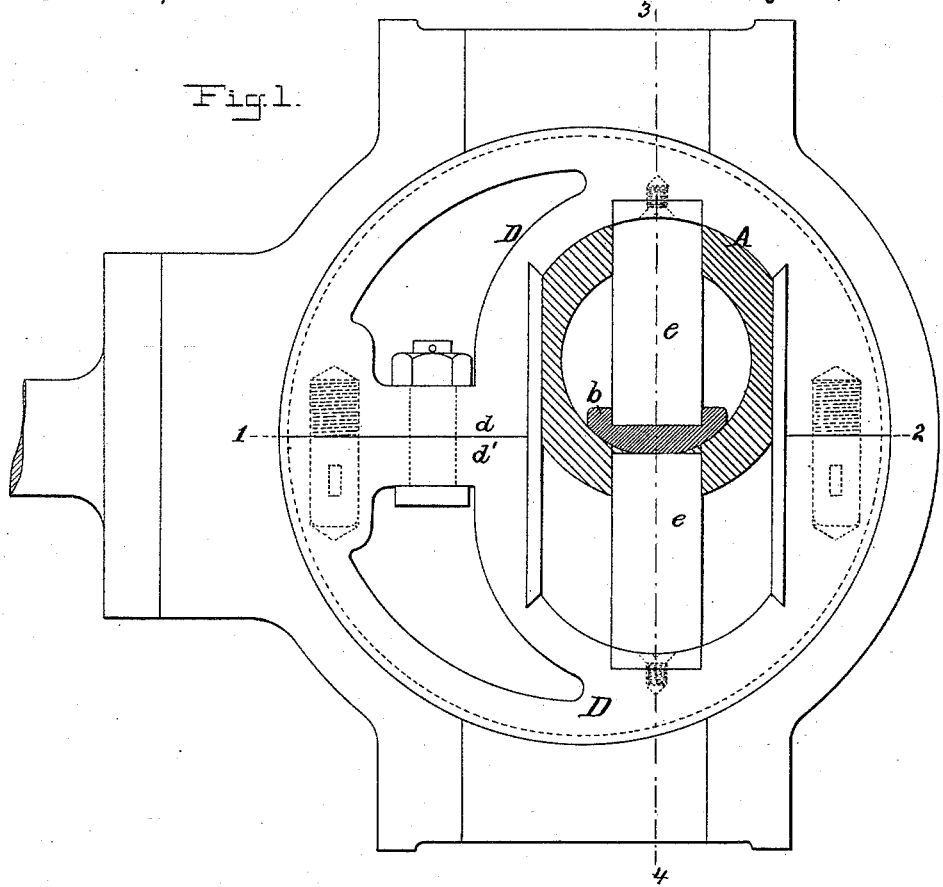
Figure 2:
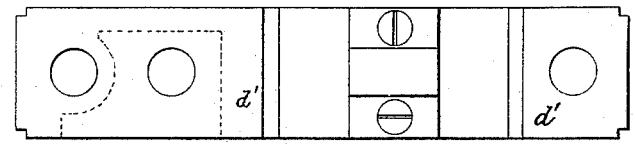
Figure 6:
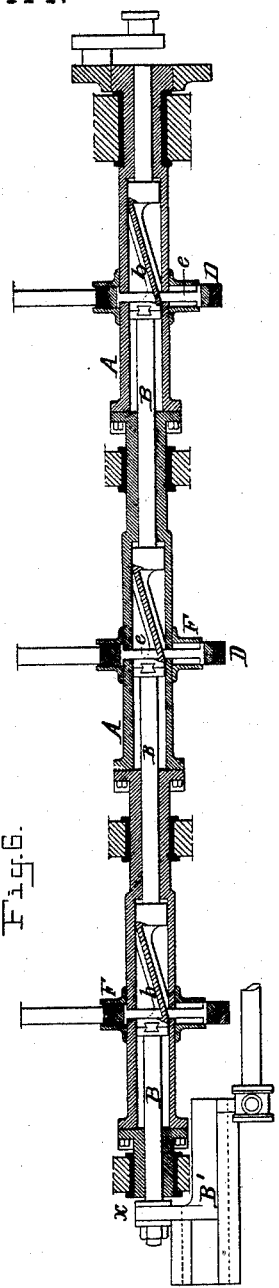
Figure 3:
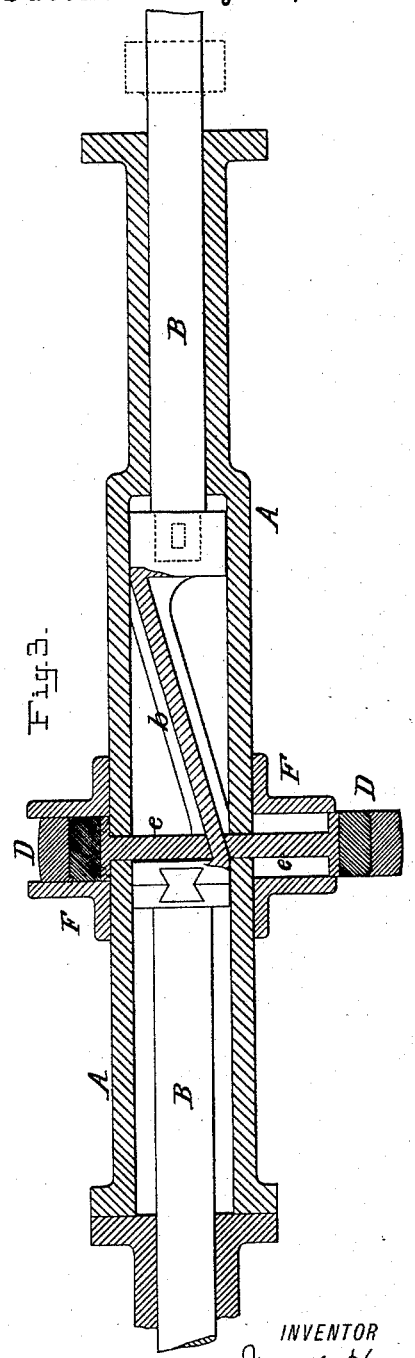

In the accompanying drawings, Figure 1 is a side view of an eccentric and strap and a sectional view of the eccentric-shaft and parts constructed in accordance with my invention. Fig. 2 is a sectional plan view on the line 1 2, Fig. 1. Fig. 3 is a longitudinal section on the line 3 4, Fig. 1. Figs. 4 and 5 are views illustrating the application of my invention to a marine engine. Fig. 6 is a longitudinal section of the eccentric-shaft of such an engine as constructed in accordance with my invention.

The characteristic feature of my invention is the construction of the eccentric so that it may be adjusted across its shaft, and the provision of means for effecting that adjustment while the shaft is in motion, so that this improvement may be employed instead of the ordinary link motion to adjust and control the valve or valves of an engine for varying the cut-off or for reversing.

In carrying out my invention as applied to the valve-gear of an engine, I prefer to employ for the eccentric-shaft a counter-shaft suitably placed for acting in the most direct way conveniently possible on one or several valve-spindles and driven in any convenient manner from the crank-shaft; but the eccentric may be otherwise driven and arranged, for instance, on the end of the crank-shaft itself.

In Figs. 1, 2, and 3, A is the eccentric-shaft, which is made hollow for the reception of a longitudinally-adjustable rod or bar B, which has an inclined or cam-like part *b*. This bar B can be moved longitudinally to a limited extent within the hollow shaft, but is not free to rotate independently thereof. Each eccentric D is preferably made in two parts *d* and *d'*, each part having fixed thereto a steel bar *e*. These opposite bars *e*, when the eccentric is fitted on the shaft, enter through diametrically-opposite slots into the interior of the shaft, as shown in Figs. 1 and 3, and the beveled inner ends of these bars *e* come into contact with the opposite sides of the inclined part *b* of the longitudinally-adjustable bar. As shown in Figs. 1 and 3, the inclined part *b* of this bar B is flanged at the edges for the reception of the inner ends of the bars *e*, which thus guide the bar B. The eccentric and its strap are arranged between face-plates F, Fig. 3, secured to the eccentric-shaft. It will be seen that by moving the bar B longitudinally within the eccentric-shaft the eccentric may be shifted across in one direction or the other accordingly, and, supposing the eccentric to be constructed for the operation of the slide valve or valves of an engine, this adjustment of the eccentric can be employed to vary the cut-off or reverse the engine in place of the ordinary link motion, as will be understood.

In Figs. 4, 5, and 6 I have shown the described construction of gear as applied to one form of marine engine; but it will be readily understood that my improvements may be applied to various other forms of engines with variations in construction without departing from my invention.

The engine illustrated is a triple-expansion engine with three valves at the sides of the cylinders, and the spindle S of each valve is controlled in this instance by an eccentric on a horizontal counter-shaft A, which may be driven in any suitable manner from the crank-shaft C, as by connecting-rods R. This counter-shaft is by preference made with separate sections for each eccentric controlling each valve-spindle, and the separate sections are suitably coupled together and capable of easy separation for examination or repair. The longitudinal bar with its inclines or cams controlling the eccentrics is made in sections corresponding with the sections of the shaft and connected together by suitable couplings, so that these sections may be readily separated. Longitudinal motion of this bar B for adjusting the eccentric may be imparted at one end by means of a sliding piece B', connected by a suitable swivel-coupling at $x$. This sliding piece may be moved by hand or gear, or by means of steam or hydraulic apparatus controlled by hand-levers.

In other constructions of engines, instead of constructing each eccentric of a set to act directly on its valve-spindle, all or some of them may be arranged to act through rocking shafts or levers, as, for instance, where the valves are arranged between the cylinders. In this case the rocking shafts or levers may be arranged as indicated by dotted lines at L in Fig. 5, and the several eccentrics may be placed close or near together, or a single eccentric with separate rings or straps on it may be provided for the several valve-spindles.

I claim as my invention—

1. The combination of the eccentric and a hollow shaft on which it is mounted with a longitudinal inclined bar within the hollow shaft to adjust the eccentric across the latter, substantially as described.

2. The combination of the eccentric carrying inwardly-projecting bars and a hollow shaft slotted for the passage of the said bars, and a longitudinally-movable inclined bar within the shaft to adjust the eccentric, substantially as set forth.

3. The combination of the valve-spindles of a compound engine with a series of eccentrics controlling the valve-spindles, a sectional shaft carrying the eccentric, and a sectional bar with inclines to adjust the eccentrics across the shaft.

In testimony whereof I have signed my name to this specification in the presence of two subscribing witnesses.

JAMES HOWDEN.

Witnesses:
 EDITH J. GRISWOLD,
 S. C. CONNOR.